Figure 2:
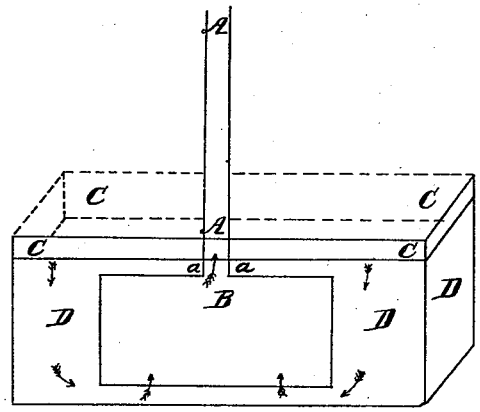
Figure 3:
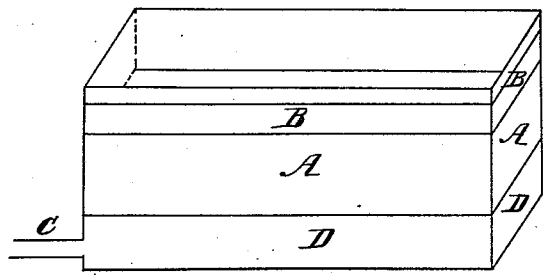

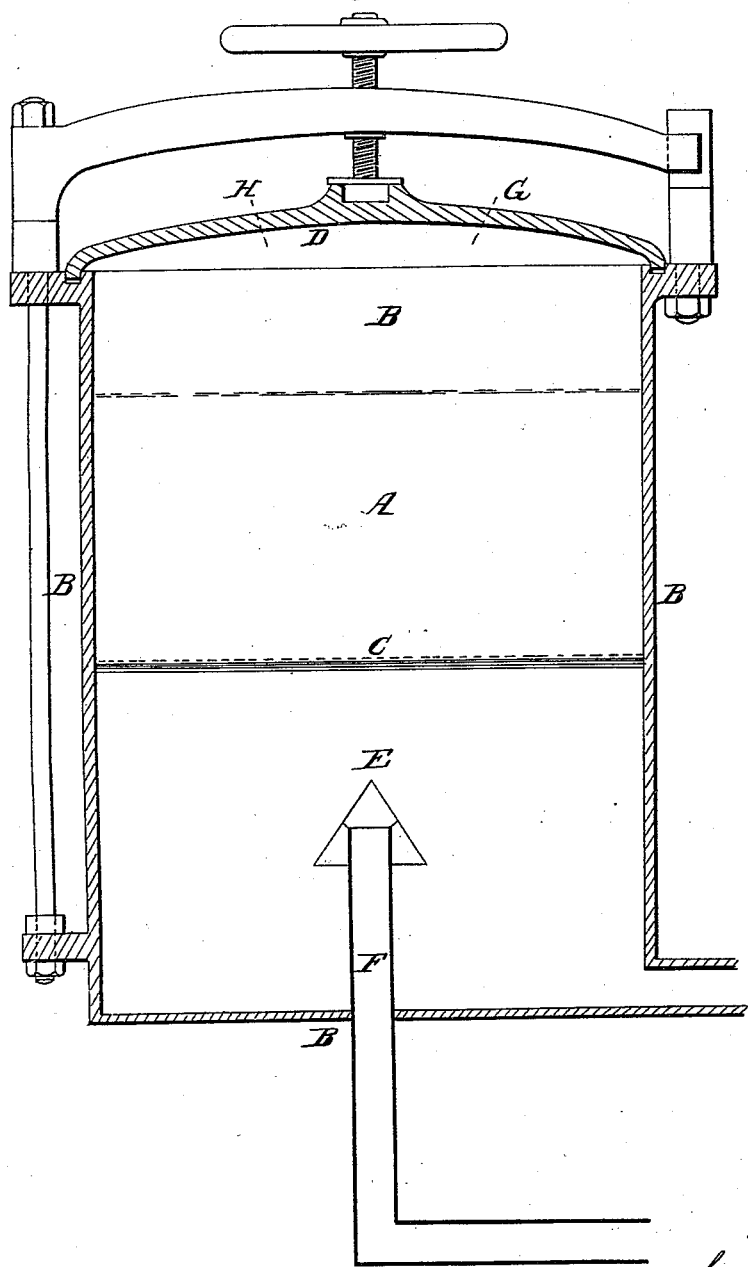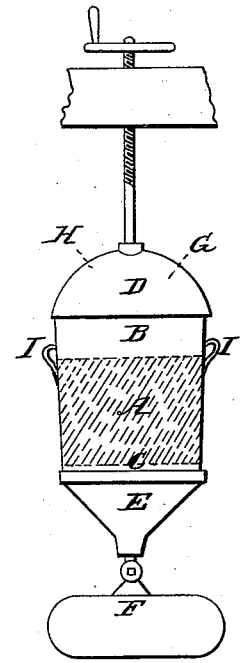

Sheet 2. 2 Sheets.

W. B. Espent.
Filter for Sugar.

N° 94,298. Patented Aug. 31, 1869.

Witnesses.
A. Moore
D. P. Cowl

Inventor.
Wm Bancroft Espent
by John B. Murray
Atty

United States Patent Office.

WILLIAM BANCROFT ESPENT, OF SPANISH TOWN, JAMAICA.

Letters Patent No. 94,298, dated August 31, 1869.

IMPROVED APPARATUS FOR PURIFYING SACCHARINE LIQUIDS, AND FOR CURING, DRYING, AND TREATING SUGAR AND OTHER MATERIALS.

The Schedule referred to in these Letters Patent and making part of the same.

*To all to whom these presents shall come:*

I, WILLIAM BANCROFT ESPENT, of Spanish Town, Jamaica, Esquire, send greeting.

Know ye that I, the said WILLIAM BANCROFT ESPENT, have invented a new and improved Method of Curing, Drying, and Extracting Molasses, and other Fluids, from Sugar, and other substances generally, and of filtering cane-juice, and other saccharine juices, and other juices and fluids generally, and apparatus to be employed therein respectively.

I do hereby declare that the following is a full and exact description thereof, reference being had to the accompanying drawings, and the letters of reference marked thereon.

My invention consists of two distinct operations and apparatus, each having its special object.

For convenience, I will describe them separately.

First, that of a new and improved method of curing, drying, and extracting molasses, and other fluids, from sugar, and other substances generally, and apparatus to be employed therein, which consists in placing the substance upon a sieve of wire-gauze, or other open material, placed in a vessel of iron, or other suitable material, so constructed as to be made air-tight when closed, and capable of resisting the pressure of the atmosphere when vacuum is created within.

Before proceeding further, I here declare that the word "substance" shall mean sugar, corn, grain, seeds, flour, meal, cotton, wool, silk, cloth, wood or other pulp, fibre, chemical substances, and all other substances generally, which require to be cured or dried, or from which fluid has to be extracted, or the germinating-principle of which has to be destroyed.

I also declare that the word "fluid" shall mean molasses, sirup, water, juice, gum, albumen, gluten, or any of them, or other fluids, present in such substances as aforesaid.

I also declare that the word "sieve" shall mean a strainer, made of wire-gauze metal, metal wire, or other perforated or porous substances applicable for the purpose.

In Figure 1, the operation is thus shown:

A represents the substance to be cured, dried, or from which fluid has to be extracted, or the germinating-principle of which has to be destroyed, which is placed in the vessel B, and rests on a sieve, C, so constructed as to retain the substance, while allowing the fluid contained in such substance to pass, percolate, or be drawn through it.

The vessel being closed and made air-tight by means of the cover D, the joint being made tight by India-rubber washer, the atmospheric pressure being thereby excluded, and vacuum being formed in the space E below the sieve C, through the pipe F, by means of suction or air-pumps, the fall of liquids, or any other known method, the fluid matter falling from the substance by the force of gravitation, assisted by the expansion of the air present above A, in the vessel D, passes through the sieve C, and is in this way separated or extracted.

*In vacuo,* all things fall equally by the earth's attraction, but the sieve C, while allowing the fluid to pass through it, retains above it the substance which contained the fluid.

When the air in the substance and in the vessel has been expanded as far as possible, and when vacuum has been formed to the greatest extent procurable, which will be ascertained by means of the vacuum-gauge H, placed in the cover of the vessel B, atmospheric air, superheated steam, or hot or dry air, (whichever is required either to dry, bake, or destroy germination,) is admitted by means of a tap or valve, G, fitted in the cover D of the vessel for the purpose.

This air, superheated steam, or hot or dry air, as the case may be, on being admitted, rushes through the substance A, to restore equilibrium in the vacuum-space E, below the sieve C, and in so rushing through, takes with it such fluid matter as may not have been already extracted by the expansion of the air above the substance, or cures, dries, bakes, or destroys the germinating-principle in the substances, as may be required.

By my process, then, continued pressure of the atmosphere is removed, and the admission of air, superheated steam, or hot or dry air, is placed completely under control, to be used or applied only in such manner as may be requisite.

The vessel can be of any size or shape, if constructed as described, and may be fitted with a side door or opening for withdrawing the substance when dried, and with a liquoring-sieve in the cover.

Second, that of a new and improved method of filtering cane-juice, and other saccharine juices, or other juices or fluids generally, and in the apparatus employed therein, which consists in filtering the juice or fluid so rapidly as to secure it from fermentation or decomposition without the application of heat.

Before describing the process, I here declare that the words "juice" or "fluid" shall mean the fluid matter of vegetables, (their juices, gums, &c.,) and any chemical or other substance in a fluid state.

I also declare that the word "filter" shall mean filtering-substances, either animal or other charcoal, cloth, sand, felt, or any other filtering-agent; and that the word "filtering" shall mean the passage of the juice or fluid through such "filter."

The ordinary processes of filtering are so slow that juices or fluids liable to become acid, ferment, or decompose, cannot be filtered rapidly enough to prevent such acidity, fermentation, or decomposition, unless heat is applied to the juice or fluid; but the application of heat to the juice of the sugar-cane and other saccharine plants, before the separation from it of the earthy and mechanical impurities present in the juice or fluid is effected, coagulates the albumen or gluten also present in the juice or fluid, and in this way these earthy and mechanical impurities become fixed in and inseparable from the coagulated albumen and gluten, or either of them.

To avoid this, then, it is necessary that the juice or fluid should be filtered, without the application of heat, rapidly enough to prevent acidity, fermentation, or decomposition.

To effect this, I place a filter either in or below the juice or fluid, and I create a vacuum on that side of the filter which is farthest from the fluid or juice on the other side of the filter.

The juice or fluid being subject or exposed to the influences of the atmosphere, the air, by its pressure, before restoring equilibrium on that side of the filter where vacuum has been formed, must drive through the filter, the fluid which is present on the outer side of the filter between it and the air.

A reference to the annexed drawings will more fully explain it.

Figure 2.

A is the suction-pipe of a pump.

B is a metal vessel, fixed air-tight on to A at *a a*, filled with the filtering-substance.

C is the vessel for holding the juice to be filtered.

D represents, with the shaded lines, the juice itself.

Vacuum being created in A by any means, the pressure of the atmosphere forces the juice through the filtering-substance into the pipe A, in the direction shown by the arrows.

Figure 3.

A represents a stratum of filtering-substance;

B, the juice to be filtered;

C, the suction-pipe of a pump; and

D, the space in which vacuum is formed by means of the pump, or by any other known method.

Vacuum being formed in D, the juice B is driven, by the force of the atmosphere, through the filtering-substance A into the pipe C.

The juice or fluid thus driven through the filter is freed from earthy and other impurities, and is ready for manufacture into the substances for which it is available.

In this way, then, juices or fluids can be filtered, any quantity in any given time, as it only depends upon the size of the filter and the extent of the vacuum obtained, to obtain any degree of rapidity.

The juice may be perfectly cold, or heated to any temperature, as most convenient.

The filter may be of any size or shape.

What I claim as my invention, and what I desire to secure by Letters Patent, is—

The extraction of fluids from substances containing them, by placing the substance to be operated on upon a surface of wire gauze or other open material, forming the bottom of a chamber, which, when the substance has been introduced, is closed air-tight by a cover. Beneath this chamber, there is a space in which vacuum being formed by any means, the air above the substance being expanded, forces its way down through the substance into the vacuum-space, and in so doing carries with it the moisture from the substance.

Also, the filtering of raw and fermentable juices and fluids by causing the juice or fluid to be driven rapidly through filtering-substances by the force of the atmosphere in its endeavor to restore equilibrium in the vacuum-space within, or in the inner side of the filtering-substance.

In witness whereof, I, the said WILLIAM BANCROFT ESPENT, have hereunto set my hand, this 27th day of , 1869.

W. BANCROFT ESPENT.

In our presence, who have witnessed the signature of the said WILLIAM BANCROFT ESPENT:

W. ALLWOOD,
A. W. HITCHINS.